United States Patent
Jeng

(10) Patent No.: US 8,310,543 B2
(45) Date of Patent: Nov. 13, 2012

(54) MOVABLE RECOGNITION APPARATUS FOR A MOVABLE TARGET

(76) Inventor: I-Horng Jeng, Taipei (TW)

( * ) Notice: Subject to any disclaimer, the term of this patent is extended or adjusted under 35 U.S.C. 154(b) by 1350 days.

(21) Appl. No.: 11/969,231

(22) Filed: Jan. 4, 2008

(65) Prior Publication Data

US 2012/0170799 A1    Jul. 5, 2012

(51) Int. Cl.
*H04N 7/18* (2006.01)

(52) U.S. Cl. ........................................ 348/143
(58) Field of Classification Search ........... 348/143–157
See application file for complete search history.

(56) References Cited

U.S. PATENT DOCUMENTS

| | | | | |
|---|---|---|---|---|
| 6,760,009 B2* | 7/2004 | Omura et al. | | 345/157 |
| 7,248,204 B2* | 7/2007 | Lovberg et al. | | 342/22 |
| 7,683,883 B2* | 3/2010 | Touma et al. | | 345/163 |
| 8,024,144 B2* | 9/2011 | Kludas et al. | | 702/85 |
| 2007/0247517 A1* | 10/2007 | Zhang et al. | | 348/30 |

OTHER PUBLICATIONS

Tadaaki Ishikawa et al, Touchless Input Device and Gesture Commands, 0-7803-8838-0/05. 2005 IEEE, p. 205-206.

* cited by examiner

*Primary Examiner* — Nhon Diep

(57) ABSTRACT

A movable recognition apparatus and a method thereof, which identify an activity configuration of at least a movable target, provide a plurality of distance measuring devices arranged as a two-dimensional matrix on a plane of a specific space to detect and obtain a plurality of vertical distance values between the movable target and the plane. Then, an analyzing device is applied to establish a contour graph corresponding to the movable target by means of referencing the vertical distance values and to identify the activity configuration in accordance with the shape change of the contour graph. Therefore, the movable recognition apparatus can perform the identification task conveniently with privacy requirement in addition to accuracy of the identified activity configuration.

17 Claims, 4 Drawing Sheets

MOVABLE RECOGNITION APPARATUS FOR A MOVABLE TARGET

BACKGROUND OF THE INVENTION

1. Field of the Invention

The present invention is related to a movable recognition apparatus for a movable target and particularly to movable recognition apparatus which provides multiple distance measuring devices arranged as a two-dimensional matrix to detect and obtain a contour graph for identifying the activity configuration of the movable target.

2. Brief Description of the Related Art

Due to progress of automation technology, the digitalized technological service has stepped into our daily life gradually. For instance, either the interactive operations of man and machine or the security monitoring system relies on the excellent quality's device working well for identifying activities of people. Hence, how to obtain a movable recognition apparatus capable of identifying the activity configuration of a movable target accurately is one of main objects the suppliers are attempting to breakthrough.

The conventional movable recognition apparatus, which employs the image analyzing technique, can provide good recognition results due to the image recording technique and the image analytic technique being largely promoted. However, the recognition space has to be mounted with a lot of the camcorders, which infringe the personal privacy, especially in the bedroom and bathroom. Nevertheless, the clearness of the recorded image is subjected to changes of the background factor such as the light to interfere with accuracy of recognition.

Further, the conventional movable recognition apparatus, which employs radio frequency identifying technique (RFID), seriously violates the principle of convenient living although the privacy can be protected. Because the identified person has to bear electronic hardware as a signal sensing medium for performing operation of the movable recognition, it is unable to meet the general rule of technology initiating from human nature. For instance, when the user forgets to carry or lost the electronic hardware, the function of the movable recognition is unable to perform. In addition, detection with the RFID is shown with point object such that it is insufficient to meet accuracy requirement of the movable recognition technique.

"Touchless Input Device and Gesture Commands", International Conference on Consumer Electronic, 2005, ICCE'05. 2005 of Digest of Technical Papers, 8-12 Jan. 2005, pp. 205-206", which is disclosed by T. Ishikawa, Y. Horry and T. Hoshino, mentions that the supersonic device is used as a sensing device to operate a man-machine interactive system with simple gesture recognition. But, the literature does not further disclose recognition of activity configuration of the movable target so that the field of application done by T. Ishikawa et al. is very limited.

SUMMARY OF THE INVENTION

Accordingly, an object of the present invention is to provide a movable recognition device and a method thereof, which provide a plurality of distance measuring devices arranged in two-dimensional matrix to detect and obtain a contour graph, such that the activity configuration of a movable target can be identified conveniently with the movable recognition apparatus under a condition of being in accordance with the privacy requirement in addition to the accuracy of recognition.

In order to achieve the preceding object, a movable recognition apparatus according to the present invention is suitable for recognizing an activity configuration of a movable target in a specific space. The movable recognition apparatus includes a plurality of distance measuring devices and an analyzing device. The distance measuring devices are arranged on a plane of the specific space as a two-dimensional matrix for detecting and obtaining a plurality of vertical distance values between the movable target and the plane. The analyzing device references the vertical distances, establishes a contour graph corresponding to the movable target and identifying the activity configuration in accordance with the shape change of the contour graph.

In a preferred embodiment, the movable recognition apparatus of the present invention further includes a transmitting and receiving device, which is disposed between the distance measuring devices and the analyzing device, to transmit said vertical distance values to the analyzing device. Wherein, the transmitting and receiving device sends the vertical distance values with the internet technique or the wireless communication technique.

In a preferred embodiment, the distance measuring devices of the movable recognition apparatus of the present invention are directional type or non-directional type supersonic distance detectors.

In a preferred embodiment, any two neighboring ones of the distance measuring devices of the movable recognition apparatus of the present invention space apart from each other a distance not greater than 50 cm and preferably less than 25 cm, the average head diameter of people for avoiding erroneous identified results.

In a preferred embodiment, the movable recognition apparatus of the present invention further includes a warning device to emit a warning message according to the identified activity configuration.

In a preferred embodiment, the analyzing device of the movable recognition apparatus of the present invention is employed to identify parameters related to the activity configuration and the parameters includes a height of said contour graph, an area of said contour graph and change of coordinates in said contour graph.

Further, a movable recognition method, which is suitable for identifying an activity configuration of a movable target in a specific space, includes following steps: providing a plurality of distance measuring devices, which are arranged on a plane of said specific space as a two-dimensional matrix, to detect and obtain a plurality of vertical distance values between the movable target and the plane; and referencing the vertical distance values to establish a contour graph corresponding to the movable target and identifying the activity configuration in accordance with the shape change of the contour graph.

Wherein, the shape change of the contour graph includes a height change of said contour graph, an area change of said contour graph and change of coordinates in said contour graph.

Wherein, when the movable target in the contour graph has a height higher than a reference height of standing, an area smaller than a reference area of standing and change of the coordinates less than reference moving values of coordinates, the activity configuration is determined as a state of standing.

Wherein, when the movable target in the contour graph has a height lower than a reference height of lying down, an area greater than a reference area of lying down and change of the coordinates less than reference moving values of coordinates, the activity configuration is determined as a state of lying down.

Wherein, when the movable target in the contour graph has a height between a reference height of standing and a reference height of lying down, an area between a reference area of standing and a reference area of lying down and change of the coordinates less than reference moving values of coordinates, the activity configuration is determined as a state of bowing.

Wherein, when the movable target in the contour graph has a height higher than a reference height of standing, an area less than a reference area of standing and change of the coordinates greater than reference moving values of coordinates, the activity configuration is determined as a state of walking.

Wherein, the vertical distance values are detected by turns by means of scanning.

Wherein, a movable recognition method of the present invention further includes a step of emitting a warning message according to the identified activity configuration.

As the foregoing, the movable recognition apparatus and a method thereof according to the present invention does not provide camcorders in the specific recognition space and the movable target itself is not necessary to carry hardware device such that the activity configuration of a movable target can be identified conveniently with the movable recognition apparatus under a condition of keeping privacy in addition to the accuracy of recognition.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
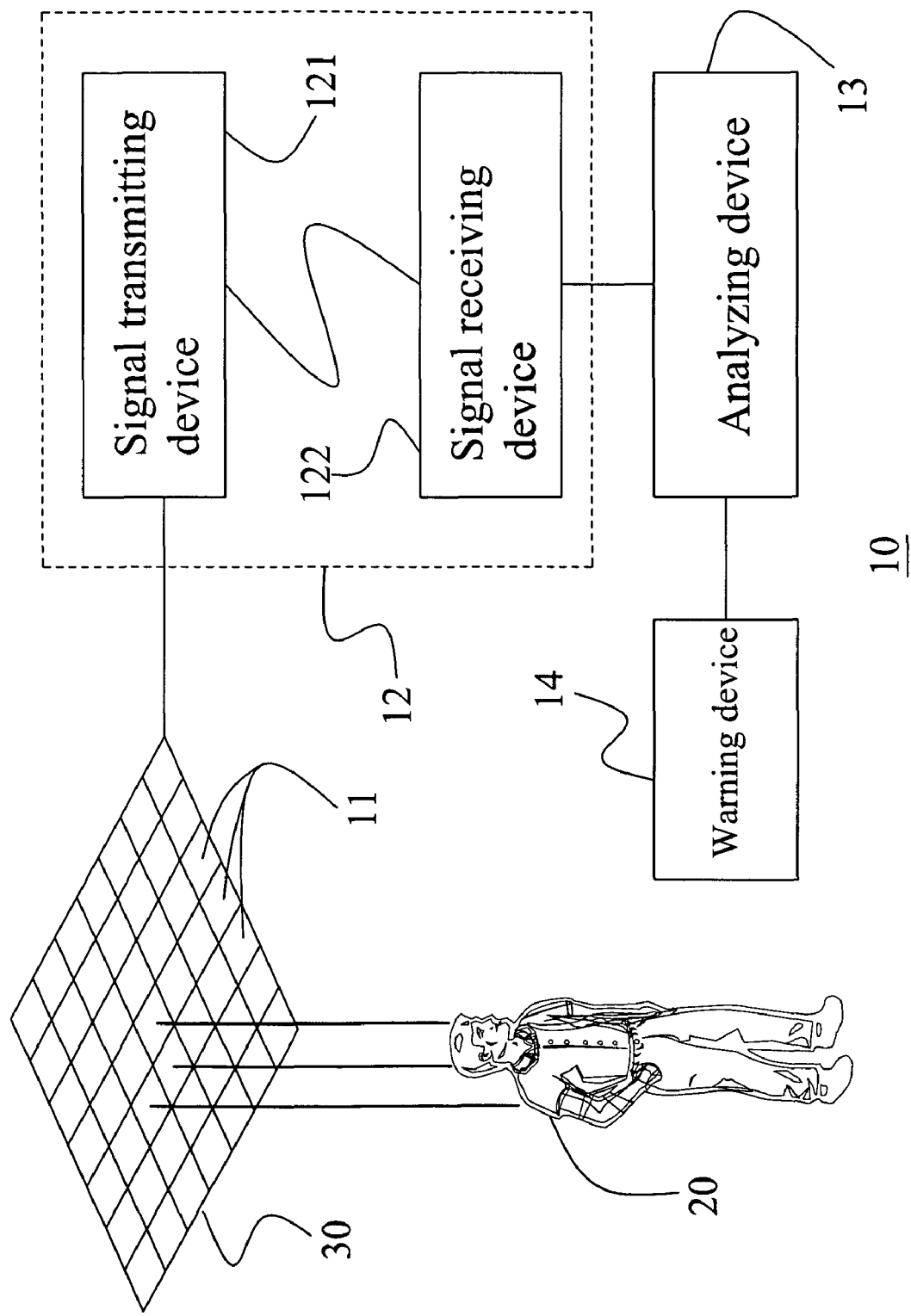
FIG. 1 is a block diagram illustrating relation between the parts provided in a preferred embodiment of a movable recognition apparatus according to the present invention.

Referring to FIG. 1, a preferred embodiment of a movable recognition apparatus for a movable target is illustrated. As the previous description, it is not necessary to provide camcorders for the movable recognition apparatus 10 in a specific space and it is not necessary for the movable target 20 itself such as a person or an animal to carry a hardware device corresponding to the camcorders in order to identify the activity configuration of the movable target 20 in the specific space. Therefore, the movable recognition apparatus 10 is especially suitable for being mounted to a location, where the privacy is extremely cared and any hardware devices are not suitable for being carried with movable target 20, such as the bedroom or bathroom. An example, which is supposed that the movable recognition apparatus 10 is provided in the bathroom for performing personal security, will be explained hereinafter.

It can be seen in FIG. 1 that the movable recognition apparatus 10 includes a plurality of distance measuring devices 11, which are arranged in a form of two-dimensional matrix at the ceiling surface 30 of the bathroom, an analyzing device 13 such as a computer, and an transmitting and receiving device 12 and a warning device 14. Both of the transmitting and receiving device 12 and the warning device 14 are disposed between the distance measuring devices 11 and the analyzing device 13. The transmitting and receiving device 12 further has a signal transmitting device 121 and a signal receiving device 122.

The distance measuring devices 11 is employed to detect and obtain a plurality of vertical distances between the movable target 20 and the surface of the ceiling 30. The measured vertical distance values are transmitted to the analyzing device 13 at another end via the transmitting and receiving device 12 by means of the internet technique or the wireless communication technique such as WiFi, WiMAX, GSM/CPRS, and 3G. The analyzing device 13 establishes a contour graph corresponding to the movable target 20 with referencing the measured vertical distance values done by the distance measuring devices 11 and identifies the activity configuration of the movable target 20 based on shape changes of the contour graph. The recognition means can be adopted with the artificial intelligence of the automatic machine classification technique and statistic methods except observing changes of the contour graph such as height, area and coordinates. The artificial intelligence further includes the neural network, the fuzzy logic, the Petri net, the machine learning, the genetic algorithm, the decision tree and the symbolic rules. Any combinations of the preceding types of the artificial intelligence can be used as ways for aiding the task of recognition. Besides, in case of the identified activity configuration showing the movable target 20 being under an unsafe situation, such as lying down on the floor too much longer that probably means the movable target 20 being under a hazard of carbon monoxide intoxication or falling down due to loss of consciousness, the warning device 14 is capable of emitting warning signal to notify other persons for rescue.

The distance measuring devices 11 shown in FIG. 1 are directional type or non-directional type supersonic distance detectors. In order to avoid excessive error resulting from subsequent detecting the activity configuration of the movable target 20, every two neighboring distance measuring devices 11 should be spaced apart from each other a distance not greater than 50 cm and it is preferable that the distance is small than 25 cm, which is the diameter of the average human head. Besides, it is noted that the distance measuring devices 11 can be arranged to form another two-dimensional matrix type such as a beehive shaped arrangement, which is known by persons who are skill in the art, instead of a typical shaped two-dimensional matrix as shown in FIG. 1.

The reason why the internet technique or the wireless communication technique is used for the transmitting and receiving device 12 shown in FIG. 1 to transmit the vertical distance values measured by the distance measuring devices 11 is to perform communication with the far side. If the analyzing device 13 is not far from the distance measuring devices 11, the short distance communication technique such as Blue Tooth or infrared can be employed as well. Even more, the RS232 or universal series bus (USB) can be used for the analyzing device 13 connecting with the distance measuring devices 11 directly without the transmitting and receiving device 12 in the field of short distance communication.

Figure 2:
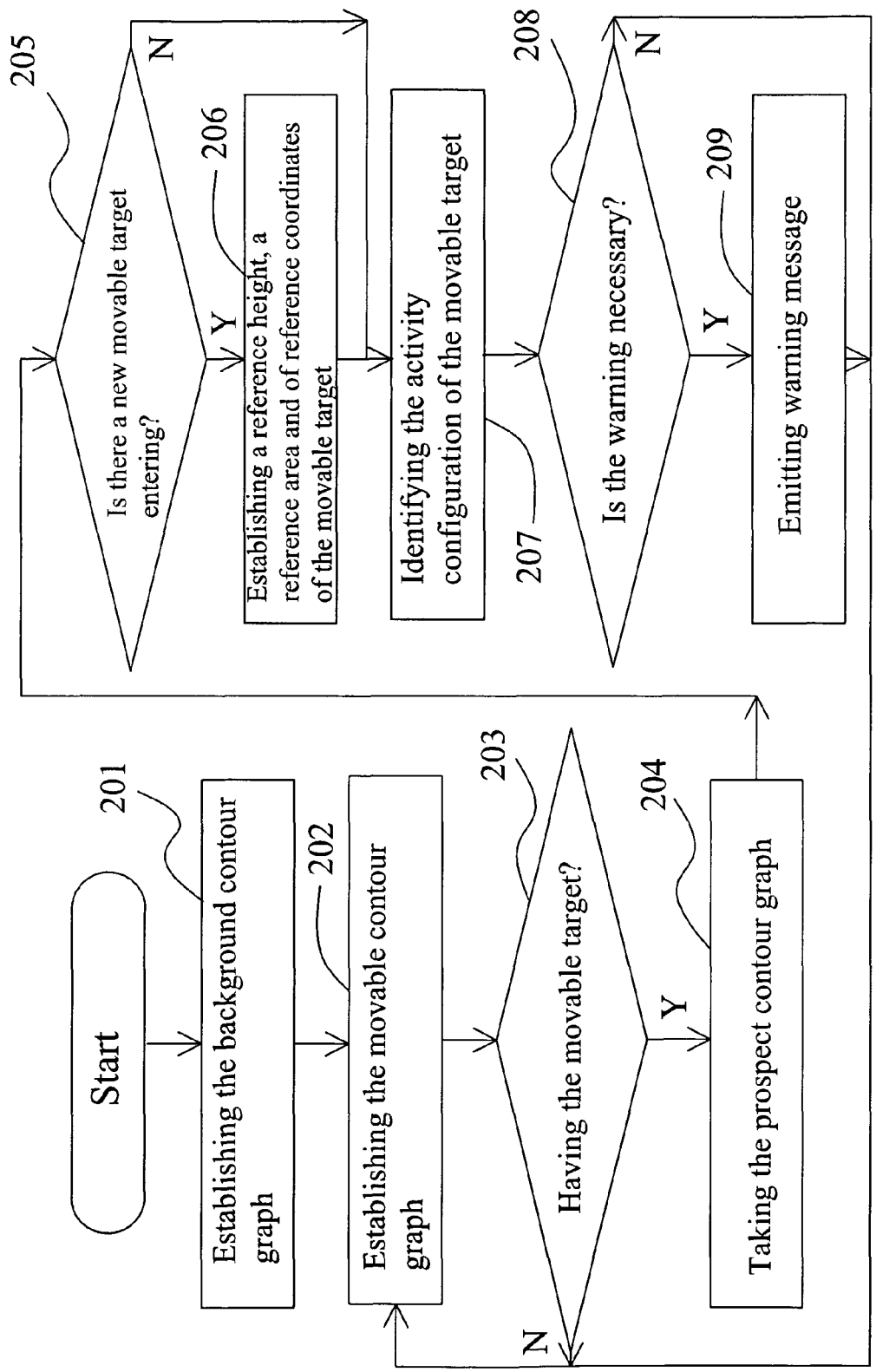
FIG. 2 is a flow chart illustrating the activity configuration of the movable target being identified by the analyzing device shown in FIG. 1.

Referring to FIG. 2, a flow chart of the analyzing device 13 identifying the activity configuration of the movable target 20 is illustrated. The analyzing device 13 carries out the process shown in the flow chart after the vertical distances between the movable target 20 and a plane are detected by the distance measuring devices 11 shown in FIG. 1 and sent to the analyzing device 13. The detected vertical distances are referenced by the analyzing device 13 such that the contour graph of the movable target 20 is established and the activity configuration of the movable target 20 can be identified based on the shape changes of the contour graph.

In step 201, the analyzing device 13 establishes a background contour graph, which is without containing the movable target 20, and saves the background contour graph in the beginning. The background contour graph is employed as a reference for detecting the activity configuration of the movable target 20 while the movable target entering a specific space. In step 202, the movable contour graph of the movable target 20 is built based on the vertical distances detected by the distance measuring devices 11. In step 203, a difference between the movable contour graph and the background contour graph is compared to determine if the movable target enters the specific space.

In case of no movable target being detected in the specific space in step 203, the process returns to step 202. In case of the movable target being detected in the specific space in step 203, the process moves to step 204 and the prospect contour graph of the movable target 20 is detached from the background contour graph. Then, the process moves to step 205. In step 205, analyzing device 13 detects if a new movable target 20 enters the specific space. In case of a new movable target 20 entering the specific space, the process moves to step 206. Parameter related to the activity configuration of the new movable target are established for recognizing the new movable target 20 and the parameters includes a reference height of the movable target 20, a reference area of the movable target 20 and a pair of reference coordinates of the movable target 20.

The height of the movable target 20 can be figured out with the vertical distance values measured by the distance measuring device 11 and the distance between the surface of the ceiling 30 where the distance measuring devices 11 are mounted to and the activity plane of the movable target 20. The area of the movable target 20 is figured out with the outermost contour line of the contour graph of the movable target 20. The coordinates of the movable target 20 are measured with respect to a reference point in the contour graph such as the center of the gravity.

In addition, the quantities and the magnitudes of the reference height, the reference area and the reference coordinates are determined in accordance with the activity configuration of the movable target 20. For instance, the activity configuration of the movable target 20 in the preferred embodiment at least includes a state of standing, a state of lying down, a state bowing and a state of walking, and it is necessary at least to establish a reference height of standing, a reference height of lying down, a reference area of standing, a reference area of lying down and reference moving values of coordinates in order to meet requirements of recognition.

Figure 3:
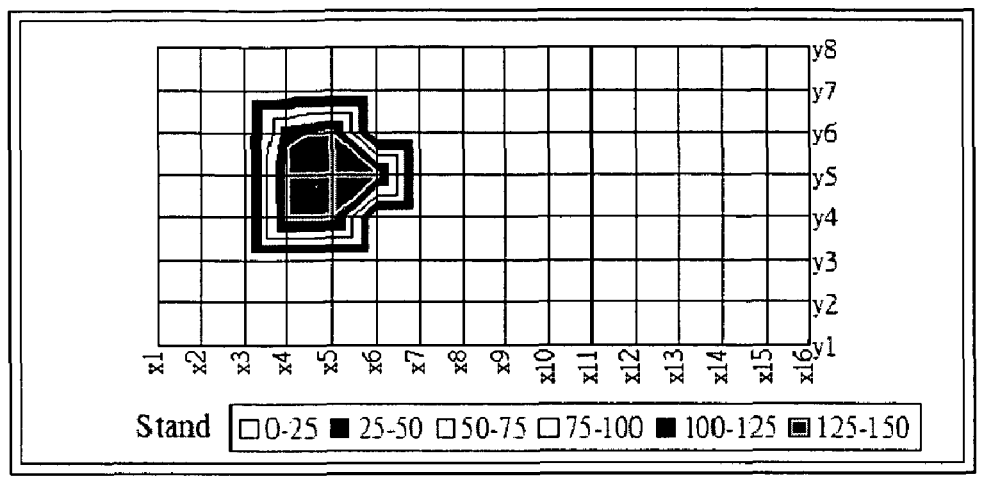
FIG. 3 is a diagrammatic graph illustrating the activity configuration of the movable target shown in FIG. 1 being a state of standing.
Figure 4:
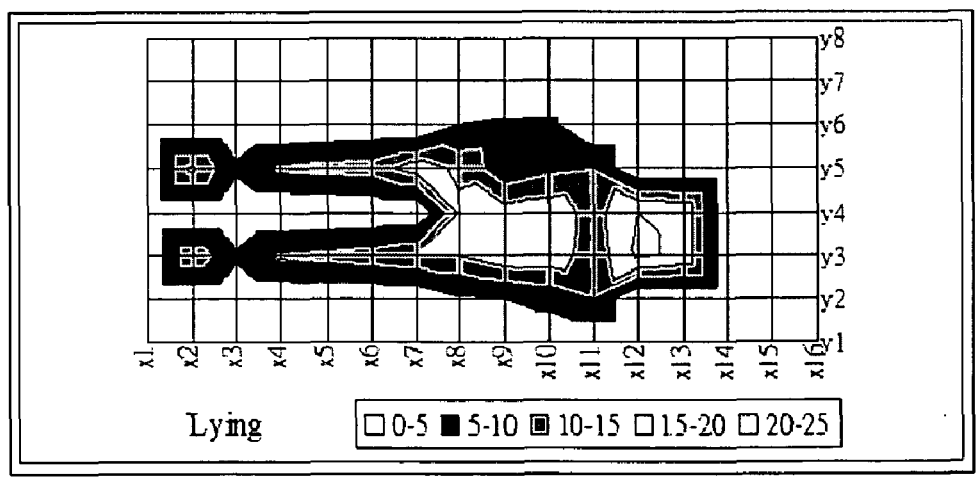
FIG. 4 is a diagrammatic graph illustrating the activity configuration of the movable target shown in FIG. 1 being a state of lying down.
Figure 5:
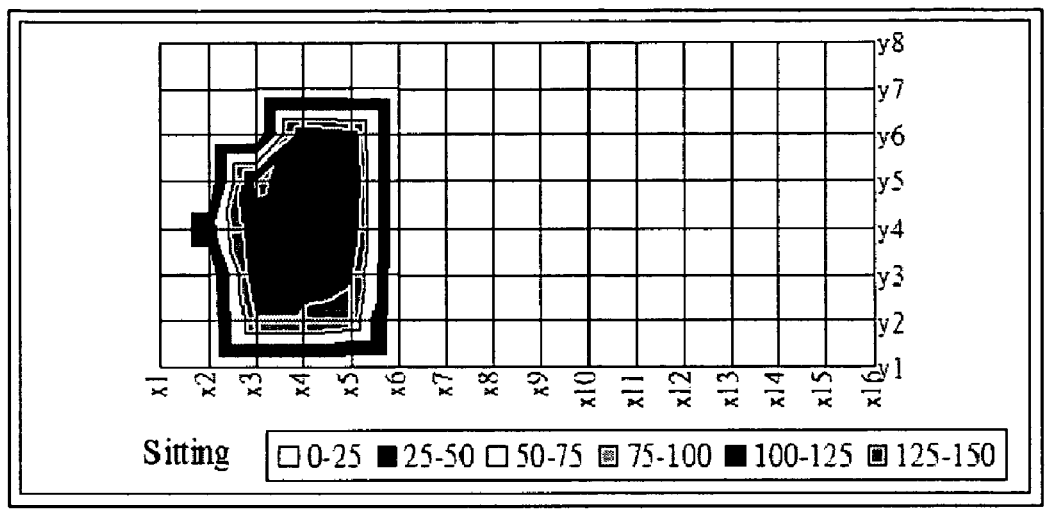
FIG. 5 is a diagrammatic graph illustrating the activity configuration of the movable target shown in FIG. 1 being a state of bowing.

In step 207, in case of the movable target 20 in the contour graph providing a height higher than the reference height of standing, an area smaller than the reference area of standing and change of the coordinates less than the reference moving values of coordinates, the activity configuration of the movable target 20 is determined as the state of standing (shown in FIG. 3). In case of the movable target 20 in the contour graph providing a height lower than the reference height of lying down, an area greater than the reference area of lying down and change of the coordinates less than the reference moving values of coordinates, the activity configuration of the movable target 20 is determined as the state of lying down (shown in FIG. 4). In case of the movable target 20 in the contour graph providing a height between the reference height of standing and the reference height of lying down, an area between than the reference area of standing and the reference area of lying down, and change of the coordinates less than the reference moving values of coordinates, the activity configuration of the movable target 20 is determined as the state of bowing (shown in FIG. 5). In case of the movable target 20 in the contour graph providing a height higher than the reference height of standing, an area smaller than the reference area of standing and change of the coordinates greater than the reference moving values of coordinates, the activity configuration of the movable target 20 is determined as the state of walking.

Finally, in step 208, it is to determine if the warning message is needed to send out. In case of the warning message being needed to send out, the process moves to step 209. For example, if the activity of configuration is identified as the state lying down and the state of lying down lasts too much longer, it means the movable target 20 itself probably being in danger and losing active ability and a message for help being necessary to send out.

It has to mentioned exceptionally that it is strongly suggested the directional type distance measuring device 11 be adopted if the space between any two neighboring distance measuring devices 11 are small in order to avoid measurement error resulting from interference between measuring signals. Nevertheless, if the non-directional distance measuring devices 11 are adopted due to cost saving consideration, the distance measuring devices 11 perform the tasks of scanning and measuring by turns so as to enhance accuracy of measurement.

Further, in step 207, the activity configurations can be changed to comply with the movable recognition apparatus 10 working in different application situations. Taking the previous description as an example, if the objects in the background contour graph are considered with respect to the movable target 20, the change of the whole activity of the movable target 20 can be identified completely. For instance, a toilet, a sink and a bath tub are normally equipped in the bathroom such that an advanced activity configuration such as seating on the toilet or bowing for washing face can be recognized in case of the background contour graph involving the equipment.

While the invention has been described with referencing to a preferred embodiment thereof, it is to be understood that modifications or variations may be easily made without departing from the spirit of this invention, which is defined by the appended claims.

What is claimed is:

1. A movable recognition apparatus, which is suitable for identifying an activity configuration of at least a movable target in a specific space, comprising:
   a plurality of distance measuring devices being arranged on a plane of said specific space as a two-dimensional matrix for detecting and obtaining a plurality of vertical distance values between said movable target and said plane; and
   an analyzing device referencing said vertical distances, establishing a contour graph corresponding to said movable target and identifying said activity configuration in accordance with shape changes of said contour graph.

2. The movable recognition apparatus as defined in claim 1 further comprises a transmitting and receiving device, which is disposed between said distance measuring devices and said analyzing device, to transmit said vertical distance values to said analyzing device from said distance measuring devices.

3. The movable recognition apparatus as defined in claim 2, wherein said transmitting and receiving device sends said vertical distance values with internet technique.

4. The movable recognition apparatus as defined in claim 2, wherein said transmitting and receiving device sends said vertical distance values with wireless communication technique.

5. The movable recognition apparatus as defined in claim 1, wherein said distance measuring device are supersonic distance detectors.

6. The movable recognition apparatus as defined in claim 5, wherein said supersonic distance detectors are directional type distance detectors.

7. The movable recognition apparatus as defined in claim 1, wherein a distance between any two neighboring ones of said distance measuring devices is not greater than 50 cm.

8. The movable recognition apparatus as defined in claim 1 further comprises a warning device to emit a warning message according to said identified activity configuration.

9. The movable recognition apparatus as defined in claim 1, wherein said analyzing device recognizes a plurality of parameters related to said activity configuration and said parameters includes a height of said contour graph, an area of said contour graph and change of coordinates in said contour graph.

10. A movable recognition method, which is suitable for recognizing an activity configuration of at least a movable target in a specific space, comprising following steps:
   (A) providing a plurality of distance measuring devices, which are arranged on a plane of said specific space as a two-dimensional matrix, to detect and obtain a plurality of vertical distance values between said movable target and said plane; and
   (B) referencing said vertical distance values to establish a contour graph corresponding to said movable target and identifying said activity configuration in accordance with shape changes of said contour graph.

11. The movable recognition method as defined in claim 10, wherein said shape changes include a height change of said contour graph, an area change of said contour graph and change of coordinates in said contour graph.

12. The movable recognition method as defined in claim 11, wherein when said movable target in said contour graph has a height higher than a reference height of standing, an area smaller than a reference area of standing and change of the coordinates less than reference moving values of coordinates, said activity configuration is determined as a state of standing.

13. The movable recognition method as defined in claim 11, wherein when said movable target in said contour graph has a height lower than a reference height of lying down, an area greater than a reference area of lying down and change of the coordinates less than reference moving values of coordinates, said activity configuration is determined as a state of lying down.

14. The movable recognition method as defined in claim 11, wherein when said movable target in said contour graph has a height between a reference height of standing and a reference height of lying down, an area between a reference area of standing and a reference area of lying down and change of the coordinates less than reference moving values of coordinates, said activity configuration is determined as a state of bowing.

15. The movable recognition method as defined in claim 11, wherein when said movable target in said contour graph has a height higher than a reference height of standing, an area less than a reference area of standing and change of the coordinates greater than reference moving values of coordinates, said activity configuration is determined as a state of walking.

16. The movable recognition method as defined in claim 10, wherein said vertical distance values are detected by turns by means of scanning.

17. The movable recognition method as defined in claim 10 further comprises a step of emitting a warning message according to said identified activity configuration.

* * * * *